Nov. 9, 1926.

J. W. MYERS 1,606,037

THERMOSTATIC SWITCH AND THE COMBINATION THEREOF WITH AN ELECTRIC FLATIRON

Filed August 11, 1924     3 Sheets-Sheet 1

INVENTOR
Joseph W. Myers
BY
ATTORNEY

Nov. 9, 1926.  
J. W. MYERS  
1,606,037  
THERMOSTATIC SWITCH AND THE COMBINATION THEREOF WITH AN ELECTRIC FLATIRON  
Filed August 11, 1924   3 Sheets-Sheet 3

INVENTOR  
Joseph W. Myers  
BY Elliott J. Stoddard  
ATTORNEY

Patented Nov. 9, 1926.

1,606,037

UNITED STATES PATENT OFFICE.

JOSEPH W. MYERS, OF JACKSON, MICHIGAN, ASSIGNOR, BY DIRECT AND MESNE ASSIGNMENTS, OF ONE-THIRD TO JOSEPH H. MYERS, OF JACKSON, MICHIGAN; ONE-THIRD TO ARTHUR J. TUTTLE, OF DETROIT, MICHIGAN; AND ONE-THIRD TO AGNES W. MYERS AND JOSEPH W. MYERS, OF JACKSON, MICHIGAN.

THERMOSTATIC SWITCH AND THE COMBINATION THEREOF WITH AN ELECTRIC FLATIRON.

Application filed August 11, 1924. Serial No. 731,271.

My invention relates to a thermostatic switch and the combination thereof with an electric flatiron.

In electric flatirons it is desirable that the switch shall be made so that it is easily attached and detached and shall respond quickly and proportionately to the temperature of the lower plate where an upper and lower plate is used, and that the action may be readily controlled from the outside of the iron. It is also desirable to provide that the thermostatic part shall be free from strain except when actually functioning, and to provide that the sticking of the contacts shall be automatically obviated.

I accomplish these objects and others in the apparatus shown in the accompanying drawings in which:—

$a$ is the lower plate of a flatiron and $b$ is the upper plate. $a^2$ is a mortise, or groove, in the lower plate opening to the upper surface, thereof, and $b^2$ is an opening extending through the upper plate $b$, and when the iron is assembled, forming an extension of the groove, $a^2$, in the lower plate. $c$, is the cover of the iron which extends over and encloses the upper plate and engages around the edge of the lower plate on its upper surface. $ab$, $ab$, are lag screws by which the plates, $a$ and $b$, are secured together.

$e$ is the heating element. This is enclosed between two mica sheets, $d$, $d$, and is placed between the lower and upper plates, $a$ and $b$, and leads out in the ends or connections $e^2$, $e^4$.

Figure 6:
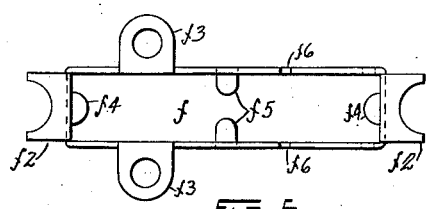
Fig. 6 is a plan view of the same.
Figure 5:
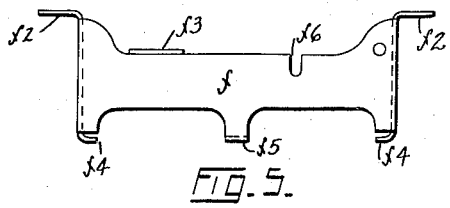
Fig. 5 is a side view of the containing frame for the switch.
Figure 7:
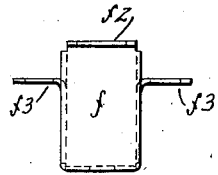
Fig. 7 is an end view of the frame shown in Figs. 5 and 6.
Figure 9:
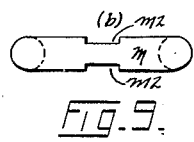
Fig. 9 is a plan view of the same.

$f$ (Figs. 5, 6, 7), is a sheet metal frame, rectangular in cross-section and having its upper ends turned over to form lugs, $f^2$, $f^2$, which are cut out in a semi-circular form to fit around the shanks of the lag screws, $ab$, $ab$, when the frame is adjusted to position. These lugs are adapted to lie on the upper surface of the upper plate, $b$, and to be clamped beneath the heads of said lag screws. The sides of the frame are cut down between the ends as shown in Fig. 5, and lugs, $f^3$, $f^3$, are turned over outwardly from said sides at this level. The ends of the frame are also turned inward to form lugs $f^4$, $f^4$, at their lower edges and the sides are turned inward to form lugs, $f^5$, at the same level as the lugs, $f^4$, $f^4$. $f^6$, $f^6$, are slots opposite each other in the sides of the frame, $f$.

$j$ (Fig. 1), is a contact arm pivoted to a pin, $fj$, which extends between the sides of the arm, $f$, at one end thereof, and extends parallel and between said sides toward the other end of said frame. $j^2$, is a spring acting upon the arm, $j$, to hold its contact point in engagement.

Figure 8:
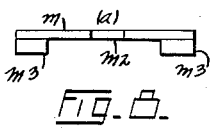
Fig. 8 is a side view of the contact yoke.
Figure 10:
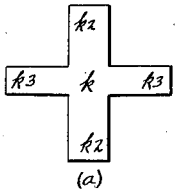
Fig. 10 illustrates the attaching piece for the contact yoke, (a) shows the blank from which the attaching piece is made, (b) shows an elevation of the same looking from one side, and (c) shows the same turned 90 degrees about a vertical axis.
Figure 10:
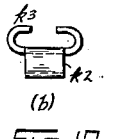
Figure 10:
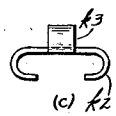
Figure 12:
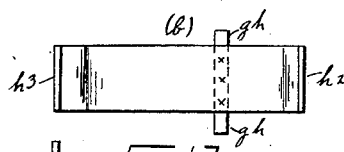
Fig. 12 is a plan view of the same.
Figure 11:
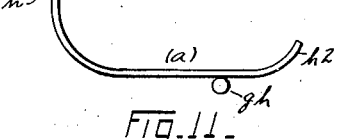
Fig. 11 is a side elevation of the piece through which the switch arm is actuated by the thermostatic element.

$m$ (Fig. 8), is a yoke having contact pieces, $m^3$, $m^3$, at its ends and lower surface. The yoke, $m$, is cut away at $m^2$, $m^2$, at the center to adapt it to be secured to the outer end of the arm, $j$. $k$, is a securing piece for the yoke, $m$, having opposite arms, $k^3$, $k^3$, and at right angles thereto the opposite arms, $k^2$, $k^2$. These arms are bent over in opposite directions, as shown in Fig. 10, (b) and (c,) the one to secure the part, $k$, to the end of the arm, $j$, and the other to secure the yoke, $m$, the arms, $k^2$, $k^2$, engaging the reduced center of said yoke. Insulating material is placed between the securing piece, $k$, and the arm, $j$.

Figure 2:
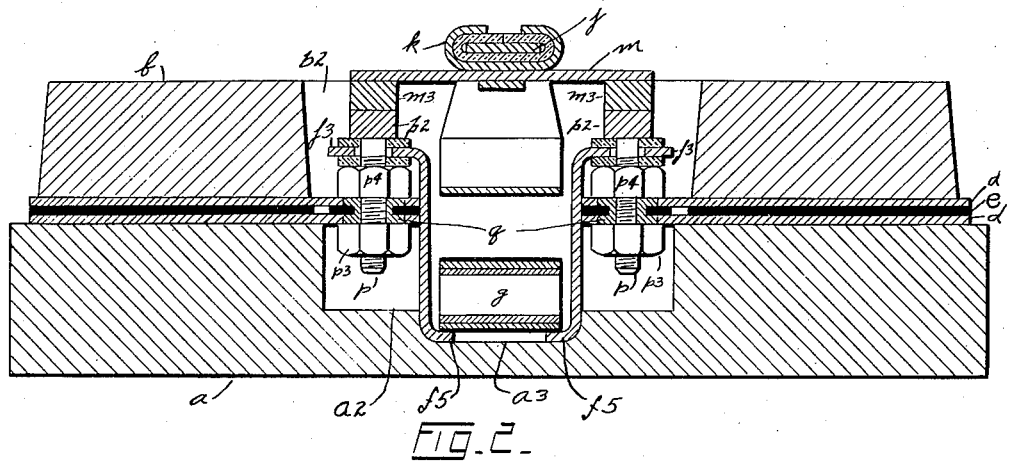
Fig. 2 is an enlarged detail section upon the line II, II, Fig. 1 partly broken away at the sides.

$q$, $q$, are eyelets clamping the ends of the heating element, $e$, that are toward the center of the iron. These eyelets, or ferrules, fit into apertures cut in the mica sheets, $d$, $d$, as shown in Fig. 2.

$p$, is a bolt having a head adapted to form an electrical contact, the shank of which passes through a lug $f^3$, and through an eyelet, $q$. There are two of said bolts, one at each side of the frame, $f$. Insulating washers are placed between the heads of said bolts and the lugs, $f$, $f$, and beneath said lugs are nuts screwed upon the threads of said bolt to clamp said washers and lugs between the head of said bolt and said nuts. The bolt, $p$, passes through an eyelet, $q$, and has a nut, $p^3$, secured on its lower end so that the heating element is clamped between the nuts $p^4$ and $p^3$.

The contact pieces, $m^3$, $m^3$, on the yoke, $m$, come in position to engage the heads of the bolts, $p$, at equal distances on each side of the arm, $j$.

The method of securing the yoke end to the end of the arm, $j$, allows an angular motion of said yoke in a vertical plane at right angles to said arm.

The groove, or cavity, $a^2$, in the lower plate, $a$, is extended along its center in a narrower slot, or cavity, $a^3$, into which the lower edges of the frame, $f$ fit, (Fig. 2).

$g$, is a thermostat made up of two similar strips of bimetallic thermostatic metal placed one upon the other and engaging at their ends. The outer surface of these strips is covered with a substance that shall readily absorb radiant heat and transmit it to the strips. $fg$, is a pin extending across from side to side of the frame, $f$, at the end thereof opposite that of the pin, $fg$. One end of the thermostatic element, $g$, is placed under this pin.

$n$, is a rotatable pin bearing in the cover, $c$, and carried by said cover. This pin is provided on the outside with a thumb piece, $n^3$, and an indicating pointer. $n^2$, is a cam secured to the pin, $p$, at the inner end thereof.

$h$, is a flat strip of metal bent up at the ends and provided on its lower surface with a pin, $gh$, the ends of which fit and are adapted to move in the slots, $f^6$, $f^6$, of the frame $f$. The metal strip, $h$, is placed between the thermostatic element $g$ and the arm, $j$, one end being adapted to contact said arm near its pivot and the other end passing up beyond the free end of said arm in position to contact the lower surface of the cam, $n^2$.

The method of adjusting and the operation of the above described device is as follows:—

The frame, $f$, is secured by the lugs, $f^3$, $f^3$, to the heating element by the nuts, $p^3$, and $p^4$, and the bolts, $p$, $p$. The frame is then placed so that its lower edges shall come in the slot, $a^3$, and the heating element upon the upper surface of the plate, $a$, the lugs, $f^2$, $f^2$, extending over the upper surface of the upper plate, $b$. The lag bolts, $ab$, $ab$, are then secured in position, the thermostatic strip, $g$, resting within the frame, $f$, on the lugs, $f^4$ and $f^5$, with one end under the pin, $fg$, the metal strip, $h$, being interposed between the arm, $j$, and the thermostatic element, $g$, with the pin, $gh$, resting by gravity upon the upper surface of said element.

Figure 1:
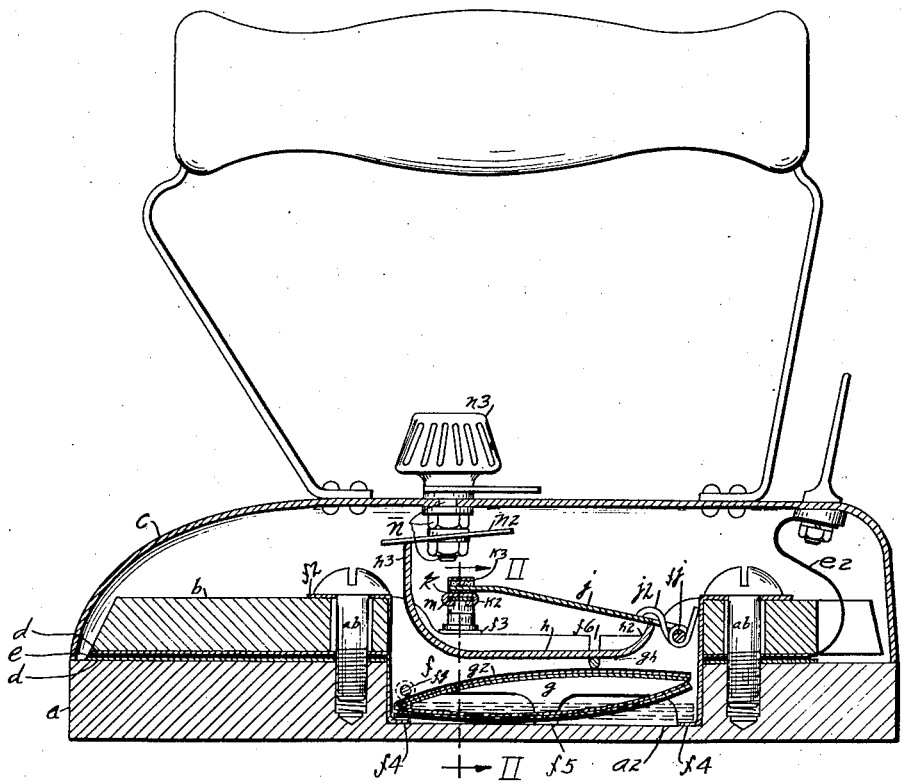
Figure 1 is a central section of an electric flatiron with the switch embodying my invention attached thereto, the section being taken on the line I, I, Fig. 3.
Figure 4:
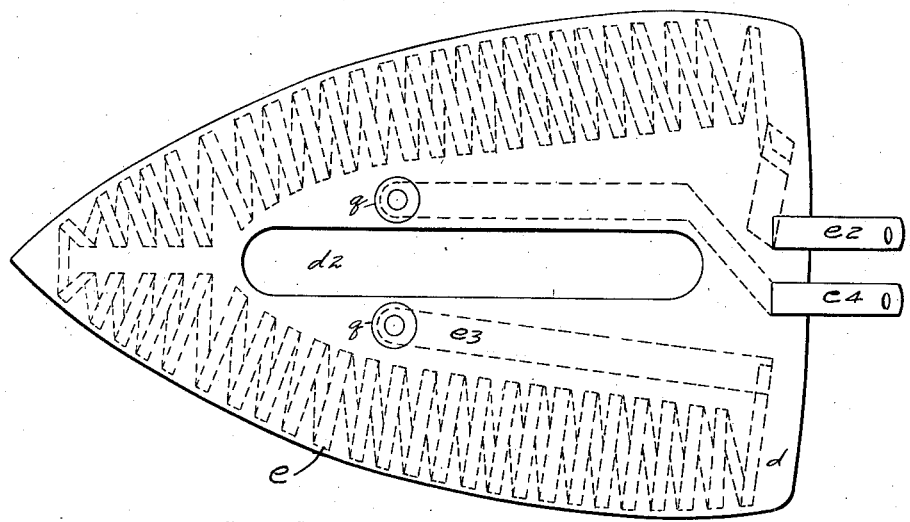
Fig. 4 is a plan view of the heating element separate from the rest of the apparatus.
Figure 3:
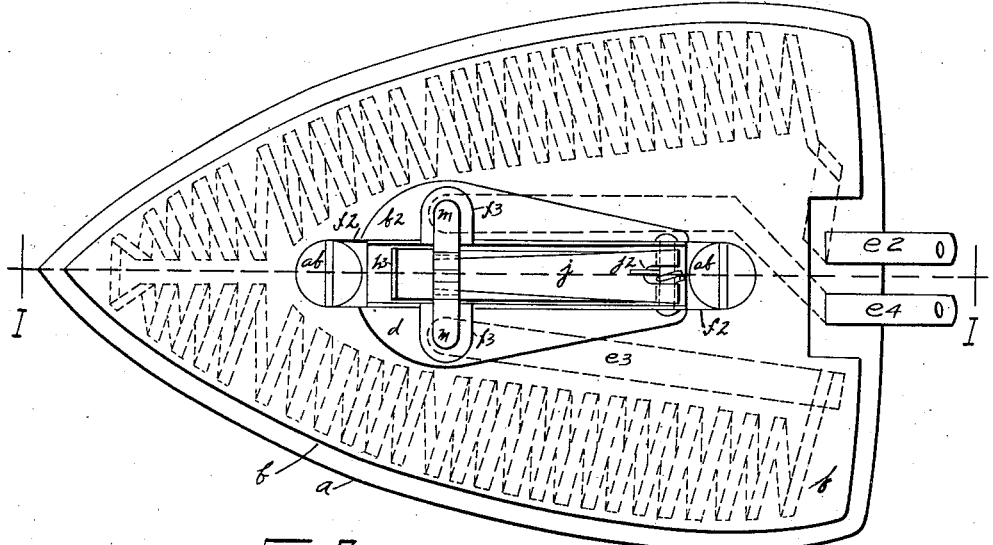
Fig. 3 is a plan view with the cover removed.

When the iron is cool the thermostat lays flat in the bottom of the frame, $f$, as shown in broken lines in Fig. 1. When the temperature of the lower plate rises, the temperature of the thermostatic element also rises, and the strips bow out from each other until said element contacts the pin, $gh$, and presses the metal strip, $h$, up against the cam, $n^2$, and arm $h$, with sufficient force to press said arm upward and carry the yoke, $m$, upward to break the circuit through the heating element. Should one of the contacts of the yoke, $m$, stick, the other will be relieved and the yoke will be turned so as to break the other contact by a prying motion.

By turning the pin, $n$, by the thumb piece, $m^3$, the point at which the upturned portion, $a^3$, of the strip, $h$, shall contact the cam, $n^2$, may be adjusted and consequently the point at which the upturned portion, $h^2$, will come against the lever arm, $h$, so that the temperature at which the contact shall be broken may be adjusted by the turning of the thumb piece, $n^3$.

The temperature of the thermostatic strip, $g$, will always correspond to the temperature of the lower plate, because it is located closely adjacent thereto, and because its outer surface is provided with a radiant heat absorbing substance so that the heat is radiated readily from the lower plate to the metal of the thermostatic element. Various substitutes may be used to produce a heat radiating and absorbing surface. These substitutes are given in treatises on heat and even ordinary shoe blackening may be used.

The metal strip, $h^2$, contacting the arm, $j$, near its pivot, the leverage of action on the arm is such as to cause a quick break of the contacts.

What I claim is:—

1. In an electrically heated flatiron, the combination of a body portion having a recess therein, and a unitary thermostatic switching mechanism adapted to be removably inserted in said recess, said mechanism consisting of a supporting shell, a stationary contact, a movable contact positioned by the upper portion of said shell and biased to keep in contact with the stationary contact, and a thermostatic strip positioned by the lower portion of said shell and adapted to actuate the movable contact to open the circuit, a cover for said iron, means on said cover movably therewith for determining the point of break of said switch.

2. In an electrically heated flatiron, the combination of a body portion having a recess therein, and a unitary thermostatic switching mechanism adapted to be removably inserted in said recess, said mechanism consisting of a supporting shell, a stationary contact, a movable contact positioned by the upper portion of said shell and biased to keep in contact with the stationary contact, and a thermostatic strip positioned by the lower portion of said shell and adapted to actuate the movable contact to open the circuit, and means connecting said strip and movable contact variable at will to determine the temperature at which the thermostat shall actuate the movable contact.

3. In an electrically heated flatiron, the combination of a body portion having a recess therein, and a unitary thermostatic switching mechanism adapted to be removably inserted in said recess, said mechanism including a supporting frame adapted to removably fit into said recess, a thermostatic strip engaging the lower portion of said frame and free to move vertically unconnected with another part, and a movable contact located above said thermostatic strip and adapted to be actuated by said strip.

4. A flatiron having an upper and a lower plate, said upper plate having an aperture extending therethrough, said lower plate having a groove in its upper surface forming an extension of said aperture, a supporting frame adapted to fit into said aperture and groove, a thermostatic element in said frame within said groove, and a switching mechanism located in the upper part of said frame, said thermostatic element being adapted to actuate said switching mechanism.

5. In an electrically heated flatiron, the combination of a body portion, and a free thermostatic strip lying upon a surface of said body portion and adapted to be bowed by a rise in temperature so as to carry its ends away from said surface, means for constraining the motion of said strip, and means for limiting the movement of one end of said strip in a direction rectangular to said surface.

6. The combination of an electrically heated object, the temperature of which is to be regulated and having a cavity in its upper surface, a free floating thermostatic strip in the bottom of said cavity and contact mechanism in the upper part of said cavity adapted to be actuated by said strip.

7. In an electrically heated flatiron, the combination of a body portion and a thermostat consisting of two strips secured together at their adjacent ends lying one upon the other and adapted to be bowed away from each other at their centers by a rise of temperature, and means for limiting the movement of one end of said strips in the plane in which said strips are bowed, said thermostat engaging upon a surface of said body.

8. In an electrically heated flatiron, the combination of a body portion having a recess, of a thermostatic switch adapted to fit into said recess, said switch consisting in part of a plurality of thermostatic strips acting in series and alternately curved in opposite directions to produce vertical movement, said strips lying upon a surface at the lower portion of said recess, a switch member disposed above said strips, retaining guides extending down from said switch mechanism to limit the lateral movement of said strips, and a contact carrying arm disposed above said strips in said recess in a position to be engaged and moved thereby.

9. In an electrically heated flatiron, the combination of a body portion thereof, with a thermostatic switch located upon and adapted to be operated by the heat of said body portion, said switch including a movable contact carrier, a thermostatic element adapted to actuate said contact carrier, a lever interposed between said element and carrier, said lever engaging said carrier, and a stationary point to prevent relative motion in the direction of the actuation of said element, said element engaging said lever, and means for adjusting the position of said stationary point toward or away from said thermostatic element.

10. In an electrically heated flatiron, the combination with a body portion thereof, a thermostatic switch located so as to be operated by the temperature of said body, said switch including a movable contact carrier, a thermostatic element adapted to actuate said carrier, a lever interposed between said element and carrier at one point, said lever engaging said carrier and engaging a stationary point to prevent relative motion in the direction of actuation of said element at a point at a distance from the first named point, said element engaging said lever so as to rotate the same about said stationary point and actuate said carrier by means of said lever.

11. In an electrically heated flatiron, the combination of a body portion thereof, a thermostatic switch located so as to be operated by the temperature of said body, said switch including a thermostatic element, a contact bearing arm extending horizontally above said element and having a point about which it oscillates, a part lying between said element and said arm contacting said arm toward the pivotal point thereof extending ing toward the free end of said arm and engaging said element and extending further toward the free end of said arm and to a point above said arm, and adjustable means for preventing the upward vertical movement of said part engaging said part at the last named point.

12. In an electrically heated flatiron, the combination of a body portion thereof, a thermostatic switch adapted to be operated by the temperature of said body portion, said switch including a thermostatic element, a contact bearing arm extending horizontally above said element and having a point about which it oscillates, a part lying between said element and said arm contacting said arm toward the pivotal point thereof extending toward the free end of said arm and contacting said element and extending further toward the free end of said arm and to a point above said arm, the part lying between said arm and element resting upon the latter by gravity and being held in position by one of its other engagements.

In testimony whereof, I sign this specification.

JOSEPH W. MYERS.